Dec. 17, 1940.    L. T. SUTHERLAND    2,224,992
RESIN-IMPREGNATED SHEET MATERIAL AND PROCESS FOR PRODUCING THE SAME
Filed June 26, 1935
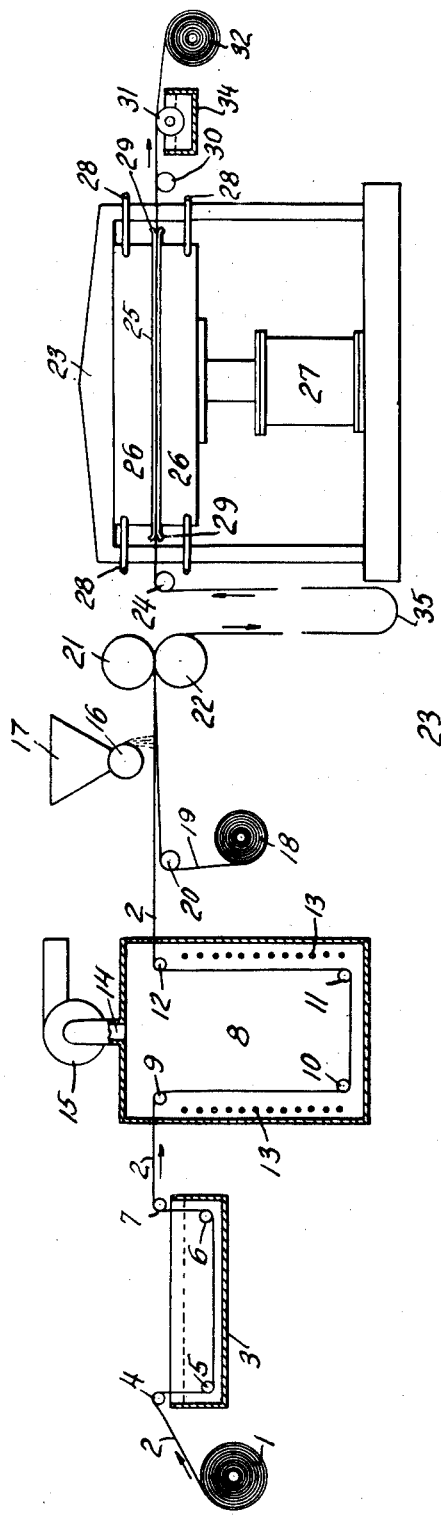
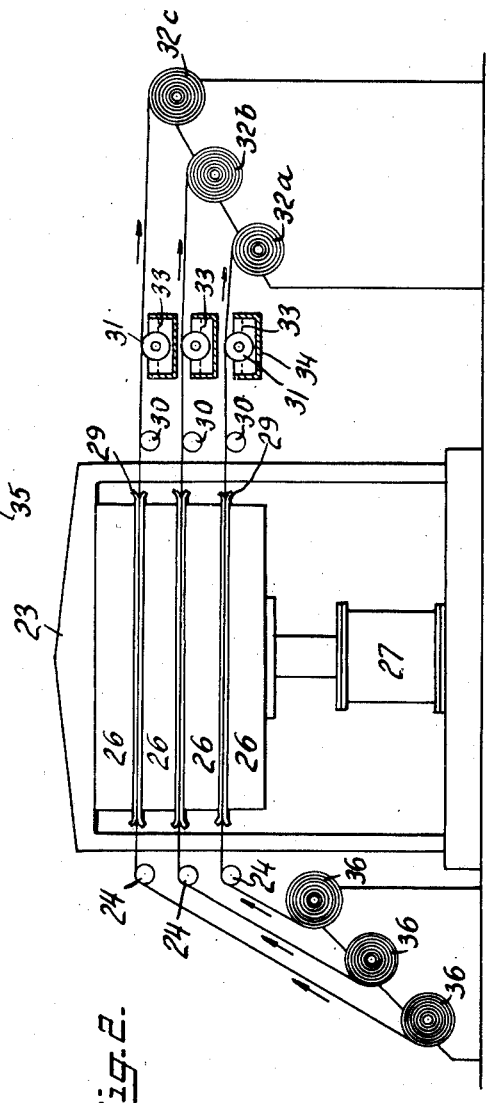
INVENTOR
Leslie T. Sutherland
BY
ATTORNEY Patented Dec. 17, 1940

2,224,992

UNITED STATES PATENT OFFICE 2,224,992

RESIN-IMPREGNATED SHEET MATERIAL AND PROCESS FOR PRODUCING THE SAME

Leslie T. Sutherland, Yonkers, N. Y., assignor to The Barrett Company, New York, N. Y., a corporation of New Jersey Application June 26, 1935, Serial No. 28,419

13 Claims. (Cl. 154—2)

This invention relates to a substantially continuous process for the fabrication of resin-impregnated shield material suitable for the protection of metallic or other articles against oxidation, corrosion or deterioration effects to which they may be subjected either by exposure to the atmosphere or by exposure to the destructive agencies present underground, and to the resultant shield material.

As pointed out in my co-pending application Serial No. 667,993, efficient protection of pipes against destructive agencies may be achieved by the provision of a substantially impervious resin-impregnated reinforcing pipe shield of light weight, resistant to moisture and sufficiently flexible to allow conformity of the shield material to the contur of a pipe. As disclosed in said application the pipe shield may be made in predetermined sizes or sections for application to a pipe.

It is an object of this invention to provide a process whereby pipe shield material is produced in a continuous sheet as distinguished from predetermined sections, which continuous sheet may be transported to the place of use and cut as the occasion demands. It is a further object of this invention to provide a process by which a continuous sheet of fibrous material may be resin-impregnated and subjected to drying and curing operations in a substantially continuous manner.

In accordance with the process of this invention, a continuous sheet of fibrous material such, for example as roofing felt, paper, or woven or knitted fabric is passed, in sequence, in a manner to be hereinafter more fully described, through a resin bath, a solvent removal or recovery treatment, a curing press and finally is treated with a glycerin solution which I have found imparts flexibility to the resin-impregnated sheet. The sheet may then be cut to size or wound into rolls in which form it may be transported where desired.

The invention accordingly comprises the several steps and the relation of one or more of such steps to each of the others and the article possessing the features and properties which are pointed out in the following detailed disclosure.

In the drawing:

Fig. 1 is a side elevation depicting the apparatus and sequence of steps whereby a continuous sheet of fibrous material may be impregnated with resin, then heated to remove the solvent constituent of the impregnating solution, coated on one side with a non-adhesive material, provided on the other side with an unsatured backing sheet, subjected to heat and pressure and then coated on the unsaturated side with a flexibilizing agent; and Fig. 2 is a side elevation of a press in which a plurality of sheets of resin-impregnated material may be simultaneously subjected to heat and pressure.

Referring now to the drawing, in which like numerals refer to like parts, in Fig. 1, reference numeral 1 represents a roll of unimpregnated fibrous sheet material, preferably felt, adapted to be unrolled in the form of a web 2. The unimpregnated felt sheet is unrolled from supply roll 1 and passed into resin bath 3, in which bath a solution of a resin, preferably of the phenol-formaldehyde type, in an alcohol or other known solvent, is maintained. The felt sheet 2 is directed over guide roll 4 and under guide rolls 5 and 6 in such a manner that it is entirely immersed in the resin solution throughout its passage through the resin bath 3. After being thoroughly impregnated with resin solution the felt sheet 2 passes out of the resin bath 3 via guide roll 7 and is advanced into a dryer or solvent removal and recovery chamber 8, being directed therethrough by guide rolls 9, 10, 11 and 12. The chamber 8 is supplied with heating means 13, preferably steam pipes, adapted to maintain the interior of chamber 8 at a sufficiently high temperature to evaporate all the solvent from the impregnated felt sheet, leaving said sheet saturated with resin. The solvent vapors are removed from the chamber 8 through exhaust duct 14 by means of a suction fan 15 and may be condensed or absorbed in suitable equipment, not shown, and re-utilized for making fresh resin solution.

The resin-impregnated felt sheet leaving chamber 8, which may be in a somewhat tacky condition, is then passed under roll 16 which is adapted to apply a non-adhesive mould-lubricating material, preferably zinc or aluminum stearate, to the upper surface of the impregnated fibrous sheet 2. Roll 16 is rotatably mounted in hopper 17 containing a supply of such non-adhesive material. If it is desired to manufacture a laminated shield having an unsaturated backing, a backing sheet may be fed from a roll 18 over roll 20 and into contact with the underside of impregnated felt sheet 2 as it passes beneath applicator roll 16. The resultant assembly of sheets then passes between compression rolls 21 and 22, over a looping rack of any well known type, indicated by reference numeral 35 and then over guide roll 24 and into the curing press 23.

Curing press 23 may be of any well known type and is adapted to compress and heat the impregnated sheet material and thereby cure or harden the resin contained in the impregnated sheet. In the case of passage of a backed resin-impregnated sheet as shown in Fig. 1, the backing is caused to substantially inseparably adhere to the resin-impregnated sheet by the bond created by the curing of the resin, a portion of which penetrates the surface of the backing in contact with the resin-impregnated sheet. In Fig. 1 of the drawing, a single press is shown which is adapted to accommodate single lengths of backed impregnated felt sheet. If desired, however, a multiple "gang" press such as shown in Fig. 2 may be used as hereinafter described. The backed resin-impregnated felt is advanced into the press between platens 25, a distance a little less than the length of the platens. Platens 25 are smooth metallic plates firmly attached to chambers 26 in such a manner that the working faces of said platens may be pressed together by means of a hydraulic or screw jack device 27. Heat is supplied to the platens by means of steam admitted to the chambers 26 through flexible inlets 28. The platens 25 extend a short distance beyond the ends of the chambers 26 and are preferably turned outwardly at the ends thereof as indicated by reference numeral 29. The purpose of this construction, as will be more fully hereinafter described, is to facilitate uniform curing and compression of the resin-impregnated felt sheet. When the impregnated sheet is in place, compression and heat are applied thereto until the resin is completely cured. Pressure is then released by moving the platens apart, the sheet advanced a distance equal to a little less than the length of the platens and the cycle repeated.

It will be noted that the pressing operation, except for the time required for the opening and closing of the platens is continuous, i e., contiguous portions of the impregnated sheet are pressed and cured substantially continuously, and contemporaneously with the curing operation the sheet is impregnated and solvent removed from the impregnated sheet. During the pressing operation, and the time required to open and close the platens, the impregnated sheet accumulates in the looping rack or the impregnated sheet may be continuously wound into a roll, preferably after dusting with the non-adhesive mould lubricating material and, in case a laminated product is desired, after association of the laminae, and later unwound and passed through the press. For example, the pressing operation may require about forty seconds, the total cycle including the opening and closing of the press and the movement of contiguous portions of the sheet therethrough, requiring about 45 seconds.

From the press the cured compressed sheet passes over guide roll 30 and over an applicator roll 31, the unsaturated side of the felt backing sheet being in contact therewith. Applicator roll 31 is adapted to rotate in a tank 34 which contains a solution of glycerin. Instead of passing the resin-impregnated sheet over roll 31, rotating in a bath of glycerin, the sheet may be passed directly through the bath and thus impregnated with the glycerin. If, however, it is desired to confine the application of glycerin to one side only of the sheet, the roll type of applicator such as shown in the drawing is employed. In this manner the backed side of the sheet may be saturated with the glycerin, which I have found results in marked improvement of the flexibility of the sheet and this without impairing the hardness and resistance to puncture and abrasion of the finished shield. As a final step the finished sheet may be cut to size or wound into rolls 32 for transportation.

Instead of the press of Fig. 1, a "multiple gang" press may be used for the curing operation thus allowing a plurality of sheets of resin-impregnated material to be cured simultaneously. In Fig. 2 a "three gang" press is shown although any number of units may be employed. If it is desired to utilize such a press the resin impregnated fibrous sheet material, as hereinabove indicated, may be wound into rolls as it leaves compression rolls 21 and 22 (Fig. 1) and a plurality of such rolls, indicated in Fig. 2 by reference numeral 36, arranged on a suitable frame adapted to permit simultaneous unrolling of the sheet material as required for the curing operation as hereinabove described in connection with Fig. 1.

It will be observed that the platens 25 of the press extend a short distance beyond the edges of the steam heated chambers 26 and are turned up at the ends as indicated by reference numeral 29. The extended portions of the platens are flexible and radiate heat. The extended portions may, if desired, be provided with water jackets or otherwise cooled to facilitate removal of heat from the edge portions of the platens. By designing the platens in this manner the boundary areas between cured and uncured sections may be subjected to tapering pressure and temperature; i. e., the terminal areas of successive portions of the web or sheet passed through the press are subjected to pressures less than that to which the main body of the web within the press is subjected, the pressure to which the terminal areas are subjected decreasing in a direction away from the main body due to the flexibility of the platens. Temperatures are similarly tapered off away from the pressing area owing to radiation and conduction from the platens to the air. Sharp lines across the sheet defining the area of each pressing and sharp differences in properties between successive segments of the pressed felt and the formation of shoulders and weak spots on the lines dividing successive cured portions are thus avoided.

Although it is preferred to use roofing felt in the manufacture of pipe shields of this invention, any fibrous material which is sufficiently absorbent to take up the resin solution and which has sufficient tensile strength to maintain its unity throughout the process may be employed. In place of felt, for instance, the pipe shields may be manufactured of paper, woven or knitted fabric such as cotton, wool or the like or from asbestos sheet or any other material of like nature. A multi-ply shield, each ply of which is impregnated, may be made or if desired, a single ply impregnated sheet without the backing sheet 19 may be made.

In the process of this invention, it is preferred to use as the impregnating medium, solutions of resins formed by reacting tar acids with reactive methylene compounds, with or without added plasticizers. The tar acids may be phenol, cresols, xylenols, etc., or mixtures thereof. The condensing agents used and the proportions of ingredients adopted may be so chosen as to yield resins of the permanently fusible or infusible type. The resins are preferably used in the preliminary or soluble stage such that they may be cured or hardened after absorption by the sheet.

The invention is not limited to the use of phenol formaldehyde resins, for instance, other resins are adaptable which are soluble in low boiling solvents in their pre-cured stage and which may be hardened by the application of heat and pressure. For example, resins of the tar-acid-furfural type, the urea-saturated-acid type, the polybasic-acid-poly-hydroxy-alcohol type or the like may be used.

In the solvent-removing operation the temperature within the chamber is preferably maintained a little higher than the boiling point of the solvent utilized to form the resin solution. The rate of passage of the resin-impregnated sheet through the dryer should be such as to allow substantially complete elimination of the solvent and to avoid any appreciable curing effect taking place in the drier or solvent-removing equipment.

In the curing process when phenolic resins are used, it is preferred to cure the resin-impregnated sheets by subjecting said sheets to a temperature of about 300° F. to about 370° F., preferably to about 340° F. and a pressure of about 200 to about 2000 pounds per square inch, and preferably about 1000 pounds per square inch. It has been found that complete curing of the resin is usually effected after a period of about 10 to about 45 seconds under the conditions stated. With shields of more than one resin-treated sheet, the time of pressing may run to 3 minutes or more.

In the flexibilizing operation it is preferred to use an aqueous solution of glycerin of about 5 to 20 per cent, and preferably about 15 per cent strength. In place of glycerin, flexibilizing substances such as coal tar oils, drying oil, Chinawood oil, etc. may be used.

The use of resin solutions has been disclosed above and this is preferred in carrying out my invention. Other ways of applying the resin may, however, be used. For example, emulsions or colloidal suspensions of the resin may be applied and the water or other carrier removed before or during curing; or, if solid in its initial state, the resin may be powdered or dusted on the sheet. In cases where the resin is applied to the sheet in finely divided solid form, whether as a suspension in a suitable menstruum or powder or otherwise, the heat applied during curing will advantageously be such as to melt the resin and cause it to be distributed at least on the surface of the sheet. Where the resin in its initial stage is liquid, it may be applied by a coating roll, or by brushing, or by spraying, or in other ways.

Where more than one layer of sheet material is used, resin may be applied to one or both surfaces of one or more layers.

Since certain changes in carrying out the above process, and certain modifications in the article which embody the invention may be made without departing from its scope, it is intended that all matter contained in the above description or shown in the accompanying drawing should be interpreted as illustrative and not in a limiting sense.

I claim:

1. A substantially continuous process for producing a resin-impregnated felt web which comprises continuously passing said web through a liquid medium containing a phenol formaldehyde resin, continuously removing the liquid medium from the impregnated web, curing said web in sections by subjecting successive sections step by step to heat and pressure, said web being held stationary during each step while the heat and pressure are applied, and subjecting the area adjacent the edge of each section during curing to tapering temperature and pressure and substantially continuously flexibilizing the cured web by impregnating the web with a solution of glycerin.

2. A substantially continuous process of producing a resin-impregnated fibrous web which comprises continuously impregnating said web with a solution of thermosetting resin, continuously removing solvent for the resin from the impregnated web, continuously placing a second fibrous web in contact with the first mentioned web, curing said assembly of webs in sections by subjecting successive sections step by step to heat and pressure to cause the aforesaid webs to substantially inseparably adhere to each other by the curing of the resin in the resin-impregnated web and impregnating one of said webs with a solution of glycerin.

3. A substantially continuous process for producing a resin-impregnated felt web which comprises continuously impregnating said web with a solution of a phenolic resin, continuously removing solvent for the resin from the impregnated web, continuously applying aluminum stearate to the surface of the impregnated web, continuously applying an unimpregnated web to the back of the first mentioned web, continually subjecting successive portions of the resultant assembly of webs to heat and pressure and continuously applying a solution of glycerin to the back of the resultant cured product.

4. In a process for the manufacture of resin-impregnated sheet material in which an unimpregnated fibrous sheet is caused to adhere to a resin-impregnated sheet by the bonding action created by the curing of the resin with which the second mentioned sheet is impregnated, the step which involves applying a solution of glycerin to the said unimpregnated sheet after the bonding of the said sheets.

5. A thermosetting resin-impregnated sheet in which the resin is in the cured state and the sheet is rendered flexible by impregnation with glycerin applied to a surface of the cured resin-impregnated sheet.

6. A substantially continuous process of producing a resin-impregnated fibrous web which comprises continuously impregnating said web with a solution of thermosetting resin, continuously removing solvent for the resin from the impregnated web, continuously placing a second fibrous web in contact with the first mentioned web, curing said assembly of webs in sections by subjecting successive sections step by step to heat and pressure to cause the aforesaid webs to substantially inseparably adhere to each other by the curing of the resin in the resin-impregnated web, said webs being held stationary during each step while being subjected to heat and pressure, the heat and pressure to which the terminal areas of each section are subjected diminishing in a direction away from the main body of the section, and impregnating the second mentioned web with a flexibilizing agent of the group consisting of glycerin, coal tar oils and drying oil.

7. A substantially continuous process for producing resin-impregnated sheet material, which comprises continuously impregnating sheet material with a solution of thermosetting resin, continuously drying said sheet material, curing said dried sheet in sections by subjecting successive sections step by step to heat and pressure, said sheet being held stationary while the heat and pressure are being applied, and continuously impregnating the cured sheet with a flexibilizing agent of the group consisting of glycerine, coal tar oils, and drying oil to flexibilize the same.

8. A thermosetting resin-impregnated fibrous sheet in which the resin is in the cured state and the cured resin-impregnated sheet is rendered flexible by impregnation with a flexibilizing agent of the group consisting of glycerin, coal tar oils, and drying oil.

9. In a process for the manufacture of thermosetting resin-impregnated fibrous sheet material, the step which comprises impregnating the sheet with a flexibilizing agent of the group consisting of glycerine, coal tar oils, and drying oil after said sheet has been impregnated with a solution of resin, the solvent removed and the resin cured.

10. In a process for the manufacture of sheet material impregnated with thermosetting resin in which an unimpregnated sheet is caused to adhere to a resin-impregnated sheet by the bonding action created by the curing of the resin with which the second-mentioned sheet is impregnated, the step which involves impregnating the resin-impregnated sheet material with a flexibilizing agent of the group consisting of glycerin, coal tar oils, and drying oil after the bonding of the said sheets.

11. A flexible rollable material comprising a thermosetting resin-impregnated fibrous sheet, the resin being in the cured state, a second fibrous sheet inseparably bonded by the cured resin to said first named sheet, said second sheet being substantially free of resin except at the bond, said second fibrous sheet containing glycerin.

12. A flexible rollable material comprising a thermosetting resin-impregnated fibrous sheet, the resin being in the cured state, a second fibrous sheet inseparably bonded by the cured resin to said first named sheet, said second sheet being substantially free of resin except at the bond, said second fibrous sheet containing a flexibilizing agent of the group consisting of glycerin, coal tar oils, and drying oil.

13. An article comprising a thermosetting resin-impregnated fibrous sheet, the resin being in the cured state, inseparably bonded by the cured resin with a second fibrous sheet substantially free of resin before bonding thereof with the resin-impregnated sheet, said article being impregnated after curing of the resin with a flexibilizing agent of the group consisting of glycerine, coal tar oils, and drying oil.

LESLIE T. SUTHERLAND.

CERTIFICATE OF CORRECTION.

Patent No. 2,224,992.   December 17, 1940.

LESLIE T. SUTHERLAND.

It is hereby certified that error appears in the printed specification of the above numbered patent requiring correction as follows: Page 3, second column, lines 32, 33, and 34, claim 3, for the words "continually subjecting successive portions of the resultant assembly of webs" read --curing said assembly of webs in sections by subjecting successive sections step by step--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.